No. 867,008. PATENTED SEPT. 24, 1907.
C. J. BRANCH.
FOOD WARMER.
APPLICATION FILED AUG. 14, 1906.

Witnesses
P. F. Nagle
L. Douville

Inventor
Charles J. Branch.
By Wiedersheim & Fairbanks
Attorneys

UNITED STATES PATENT OFFICE.

CHARLES J. BRANCH, OF PHILADELPHIA, PENNSYLVANIA.

FOOD-WARMER.

No. 867,008.     Specification of Letters Patent.     Patented Sept. 24, 1907.

Application filed August 14, 1906. Serial No. 330,600.

*To all whom it may concern:*

Be it known that I, CHARLES J. BRANCH, a citizen of the United States, residing in the city and county of Philadelphia, State of Pennsylvania, have invented a new and useful Food-Warmer, of which the following is a specification.

My invention consists of a novel construction of a food warmer whereby nurses, mothers and others are provided with an inexpensive and portable apparatus in which milk and other like food for infants or invalids can be warmed or kept warmed and ready for use throughout the night or for many hours without application of fire to said apparatus and without renewing the heating means or agent and without danger of the food being burned or appreciably deteriorated in quality.

It further consists of other novel features of construction, all as will be hereinafter fully set forth.

Figure 1:
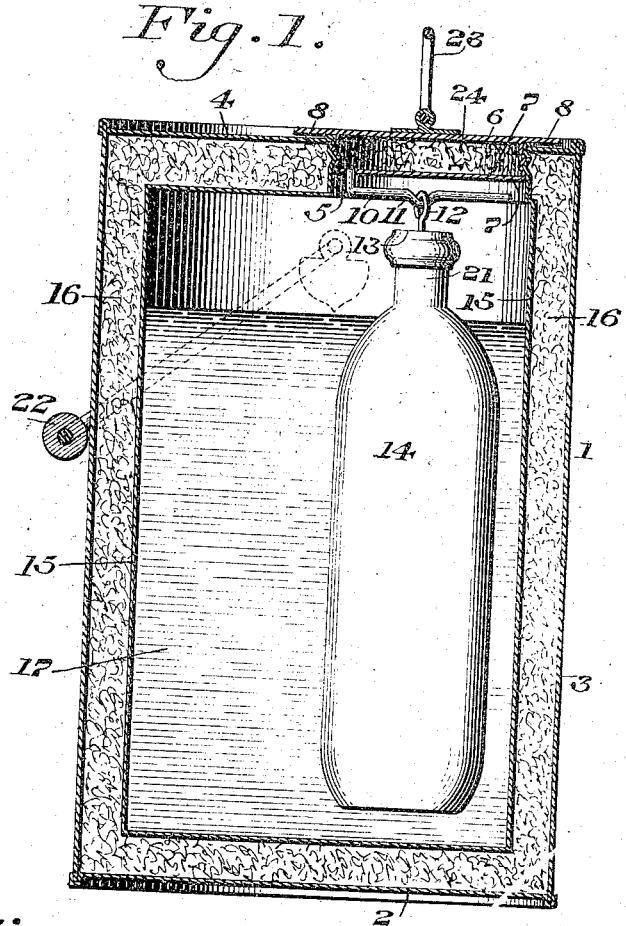
Figure 2:
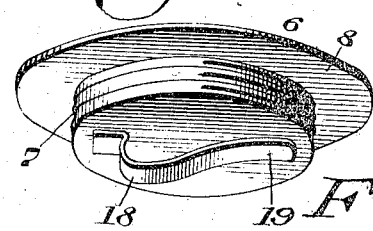
Figure 3:
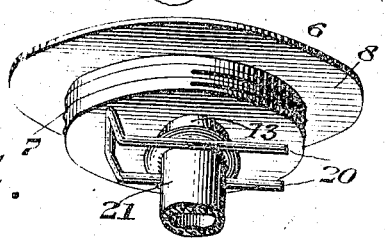
Figure 4:
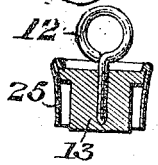

Figure 1 represents a sectional view, partly in elevation, of a food warmer embodying my invention.
Figs. 2 and 3 represent perspective views of different forms of the supporting device for the vessel containing the food to be warmed. Fig. 4 represents a sectional view of the stopper for the food receptacle in detached position.

Similar numerals of reference indicate corresponding parts in the figures.

Referring to the drawings:—1 designates my novel construction of a warmer, the same consisting of a base 2 and the outer walls 3, which may be cylindrical, rectangular or other polygonal shape and having the top 4, which is provided with the opening 5 which is adapted to be closed by a plug or closure 6, which latter consists of the body portion 7 which is preferably threaded and provided with the flange 8 which is adapted to be seated on the top 4.

10 designates a suspension device attached to the end or inner wall of the closure 6, the latter in the construction seen in Fig. 1 being provided with a depression 11 which is adapted to form a seat for the eye 12 which is attached to the stopper 13 of the bottle, jar or other receptacle 14, which may contain the food, milk or other material or substance to be warmed.

In the present instance, the stopper 13 is provided with a resilient flange 25 which may be deflected over the neck of the bottle after the closure has been placed in position therein.

15 designates the inner wall of the vessel between which is a non-conducting lining 16 whereby the heat units of the heating medium 17 are retained at the proper temperature for the desired length of time.

In the construction seen in Figs. 2 and 3 I have shown different forms of the suspension device 10. The device employed in Fig. 2 consists of a member 18 whose free end 19 is adapted to touch or nearly touch the body portion 7, while in the construction seen in Fig. 3, I employ the rods or wires 20 which are adapted to engage the neck 21 of the bottle or jar 14, which rods may be depressed as at 18 in Fig. 2.

It will be evident that the food warmer may be provided with a suitable bail or handle, as 22, and that the closure 6 may be provided with any suitable form of finger piece 23 for enabling the same to be screwed into and out of position.

As seen in Fig. 1, the closure 6 preferably contains a non-conducting material 24, for obvious purposes.

The operation is as follows:—Upon the removal of the closure 6, the interior of the warmer can be filled with the hot water or other heating medium 17 to the desired height. The operator inserts the eye 12 of the stopper of the bottle or jar upon the rod or suspension device 10 or 18 or upon rods soldered to the end or inner wall of the closure 6 which is then screwed or otherwise inserted into position, the parts then assuming the position seen in Fig. 1. The device can be placed at the bedside of the infant and its mother, attendant or nurse and is readily accessible, as for instance throughout the night, without requiring the attendant to get out of bed to heat the milk or other food by simply removing the closure 6 whereby the said bottle or jar 14 can be simultaneously withdrawn and the food or milk therein is ready for instant use. I have, however, found it desirable when food is to be warmed for the use of infant or invalid, to place the food in the warmer shortly before the time for feeding, thus obviating possible deterioration of the food from too long contact with the heating medium.

I am aware that it has heretofore been proposed to employ a non-conducting medium in a warmer and that it has also been proposed to warm infant's food in a portable apparatus, but so far as I am aware I am the first to devise a simple and efficient means whereby the closure for the vessel contains a suspension device which is adapted to interlock or engage with a portion of the jar or bottle so that upon the removal of the closure the bottle or jar containing the food can be simultaneously withdrawn with said closure or inserted in position simultaneously with said closure. Furthermore, in my novel device the bottle is always maintained in an upright position and the stopper for the bottle is instantly and conveniently accessible as soon as the closure is removed.

It is apparent that the closure 6 may be sufficiently large and the suspension device carried thereby of such character that two or more bottles or jars of food or milk may be suspended in position without departing from the spirit of my invention.

It will be apparent that while I have described my invention as being adapted for warming milk or infant's food, it is capable of a wide diversity of usage, since it can be used for warming various other liquids or fluids or substances such as gases or chemical compounds, glue, sand or the like and I do not desire to be restricted to any particular use of my novel apparatus.

It will be apparent that by reason of the novel arrangement of my device whereby I can effect the suspension of the bottle, the same is entirely surrounded not only at its sides, but its base as well, by the heating medium whereby the entire contents of the bottle are heated more efficiently than if the receptacle were placed upon its base. It will also be apparent that while I have shown the closure 6 as being screw-threaded and adapted to engage the threaded opening in the vessel, the same may be secured in position by other means than screw-threads and said screw-threads may be omitted if desired and the closure 6 held in position by its friction with the contiguous walls of the opening, or by a clamping device from without. It will also be apparent that the construction of the stopper 13 may be varied according to requirements.

It will be apparent that changes may be made by those skilled in the art in the manner of supporting the bottle and in forming the interlocking device between the bottle stopper and the closure for the vessel and while I have shown, in the present instance, forms of apparatus which I have found to give very satisfactory results in practice, I do not desire to be limited thereto in every instance and it is apparent that other changes may be made by those skilled in the art which will come within the scope of my invention.

Having thus described my invention, what I claim as new and desire to secure by Letters Patent, is:—

1. A warmer comprising a vessel adapted to contain a heating medium, a non-conducting lining for said vessel, a closure for said vessel, a suspension device secured to the inner portion of said closure and having one end disconnected from said closure, a receptacle for the material to be warmed containing a stopper, and laterally-engageable interlocking devices common to said stopper and suspension device.

2. As an improved article of manufacture, a closure for a food warmer comprising a body portion containing a non-conducting material, a flange on the top of said closure, and a horizontally-disposed suspension device secured at one end only to said closure with its other end free and springy, said closure being adapted to engage an opening in a food warmer.

3. In a food warmer a vessel adapted to contain a heating medium and having a non-conducting covering surrounding its sides, an opening in the top of said vessel, a closure for said opening also containing a non-conducting material, said closure having a flange extending over said opening, a suspension device on said closure and having one end disconnected from said closure, a receptacle containing the material to be warmed, and laterally-engageable interlocking devices common to said bottle and suspension device.

4. In a device of the character described, the combination of a food receptacle stopper comprising a body portion and a resilient flange secured thereto to engage over the neck of the receptacle, an eye engaging said body, and a suspension device for said eye said device extending substantially parallel with the under face of the stopper and having a depression near its mid length.

5. In a warmer of the character stated, a vessel adapted to contain a heating medium, and a closure for said vessel having a suspension device thereon substantially parallel with the under side of the closure with one end free.

CHARLES J. BRANCH.

Witnesses:
E. HAYWARD FAIRBANKS,
J. C. McGLASHEN.